United States Patent
Brandley et al.

(10) Patent No.: US 10,240,381 B2
(45) Date of Patent: Mar. 26, 2019

(54) PIPE AND STRAP OPERATING DRIVE SYSTEM FOR DOOR MECHANISMS AND SIMILAR STRUCTURES

(71) Applicants: J. Theodore Brandley, Newnan, GA (US); Ari M. Brandley, Newnan, GA (US)

(72) Inventors: J. Theodore Brandley, Newnan, GA (US); Ari M. Brandley, Newnan, GA (US)

( * ) Notice: Subject to any disclaimer, the term of this patent is extended or adjusted under 35 U.S.C. 154(b) by 0 days.

(21) Appl. No.: 15/882,249

(22) Filed: Jan. 29, 2018

(65) Prior Publication Data

US 2018/0216393 A1    Aug. 2, 2018

Related U.S. Application Data

(60) Provisional application No. 62/452,205, filed on Jan. 30, 2017.

(51) Int. Cl.
| | |
|---|---|
| *E06B 7/28* | (2006.01) |
| *E05F 15/627* | (2015.01) |
| *A01K 31/02* | (2006.01) |

(52) U.S. Cl.
CPC ............ *E05F 15/627* (2015.01); *A01K 31/02* (2013.01)

(58) Field of Classification Search
CPC ............................... E05F 15/627; A01K 31/02
USPC ............... 49/24, 71, 197; 119/493, 494, 524
See application file for complete search history.

(56) References Cited

U.S. PATENT DOCUMENTS

| | | | | |
|---|---|---|---|---|
| 315,250 A | * | 4/1885 | Cook ...................... | E04F 10/10 160/132 |
| 563,218 A | * | 6/1896 | Buchanan .......... | B62D 33/0273 296/58 |
| 1,899,943 A | * | 3/1933 | Clay ........................ | E06B 7/06 454/225 |
| 2,392,678 A | * | 1/1946 | Loetscher ................. | E06B 3/38 49/261 |
| 6,481,156 B1 | * | 11/2002 | Richmond ........... | A01K 1/0017 49/24 |

(Continued)

FOREIGN PATENT DOCUMENTS

| | | | | | |
|---|---|---|---|---|---|
| AT | | 334775 B | * | 2/1976 | .............. E05F 15/71 |
| DE | 202011050463 U1 | | * | 7/2011 | .............. E05F 11/06 |

(Continued)

*Primary Examiner* — Jerry E Redman
(74) *Attorney, Agent, or Firm* — J. T. Hollin, Attorney at Law, P.C.

(57) ABSTRACT

A "Pipe and Strap Operating Drive System" (PSODS) is disclosed which efficiently and accurately positions a blocker, or door mechanism, over an opening that is of exact or similar profile and dimensions as the door mechanism. In the preferred embodiment, PSODS is used to vary the position of a poultry house ventilation blocker or door mechanism from a tightly-closed position against the opening, or when required, within a certain range of door mechanism open positions, as dictated by weather conditions or internal air quality. Essentially, the inventive concept featuring PSODS utilizes at least one strap, wherein a first end of each strap is wound about a length of pipe, termed a "pipe drive." The second end of the strap is attached proximate an upper edge of the door mechanism. As the pipe drive is rotated, the attached strap(s) control movement of the door mechanism toward a closed or open position.

12 Claims, 4 Drawing Sheets

(56) References Cited

U.S. PATENT DOCUMENTS

Figure 1:
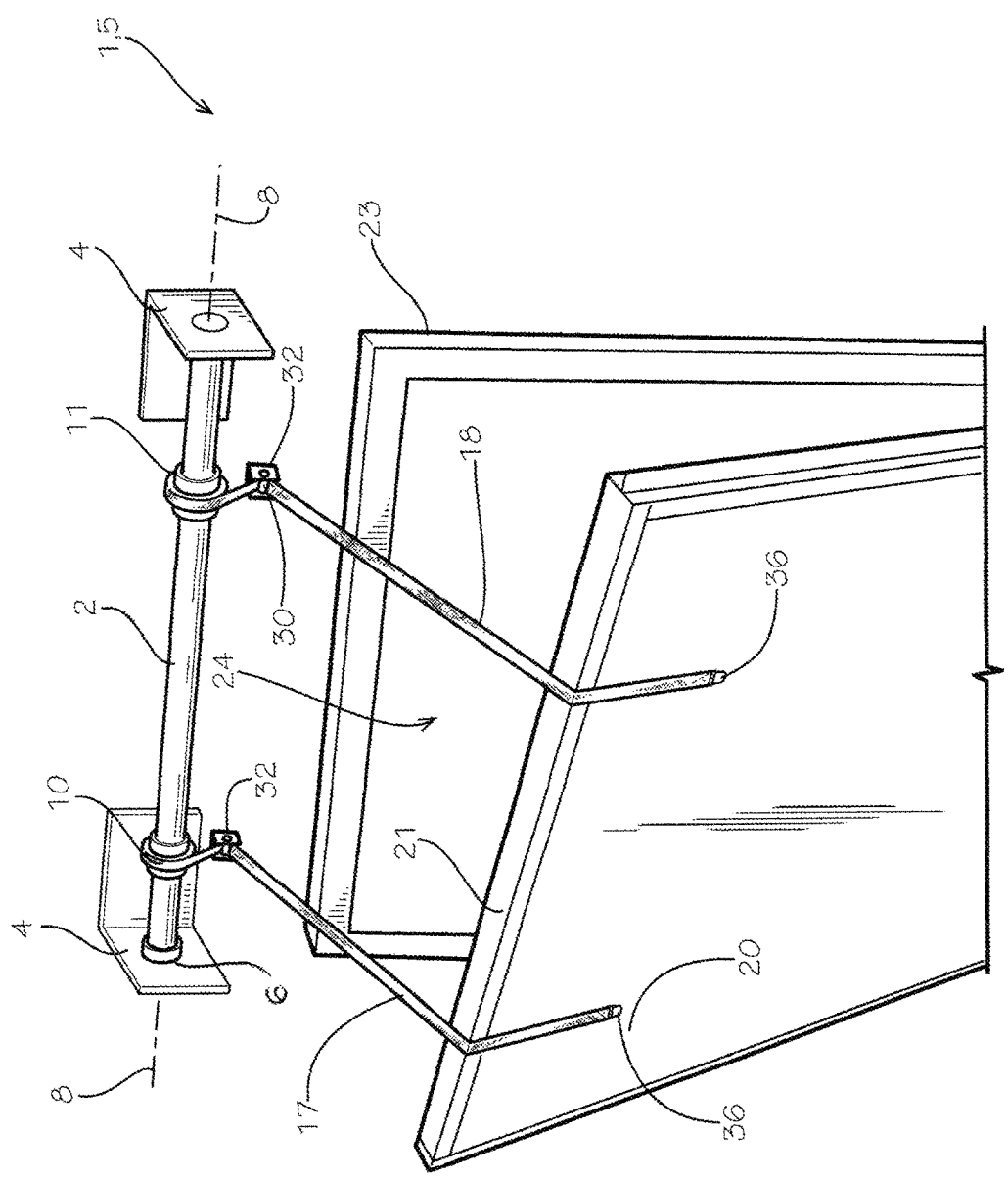

| | | | |
|---|---|---|---|
| 6,871,842 B2 * | 3/2005 | Sutton | B66D 1/06 |
| | | | 119/493 |
| 7,441,732 B2 | 10/2008 | Ferragut et al. | |
| 8,327,805 B2 * | 12/2012 | Rogge | A01K 1/0064 |
| | | | 119/437 |
| 8,549,711 B2 | 10/2013 | Apostoloff | |
| 9,302,606 B2 | 4/2016 | Danze et al. | |

FOREIGN PATENT DOCUMENTS

| | | | | |
|---|---|---|---|---|
| EP | 3216963 A1 * | 9/2017 | | E05F 15/627 |
| FR | 2413528 A1 * | 7/1979 | | E05B 47/00 |
| FR | 2480843 A1 * | 10/1981 | | E05F 15/627 |
| FR | 3053070 A1 * | 12/2017 | | E05F 15/627 |
| JP | 54144745 A * | 11/1979 | | |
| WO | WO-9316262 A1 * | 8/1993 | | E05F 15/668 |

\* cited by examiner

PIPE AND STRAP OPERATING DRIVE SYSTEM FOR DOOR MECHANISMS AND SIMILAR STRUCTURES

CROSS-REFERENCES TO RELATED APPLICATIONS

This patent application claims the benefit of priority from previously-filed U.S. provisional patent application, Ser. No. 62/452,205, filed on Jan. 30, 2017, and further, claims the benefit of content of said provisional application as though fully appearing herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The disclosures herein are primarily concerned with proper ventilation in large-scale poultry houses. Poultry and livestock houses supply fresh air to the interior of building in order to sustain healthful life of the animals confined within. Proper ventilation systems also help reduce the extremes of temperature, humidity and air contamination caused by chemical compounds, especially resulting from, for instance, large numbers of confined chickens.

Over the last thirty years poultry ventilation systems have improved considerably, thus making possible the high density populations of livestock and poultry in which are often confined in commercial facilities. This is economically important since it reduces production and labor costs.

In a considerable number of poultry raising houses, the ventilated air is controlled by ventilation doors, which either close the normal ventilation opening in substantially cold weather, or allow the doors to move to a partly open position, allowing ventilation fans to more efficiently circulate air. The ventilated air removes excess heat, moisture, dust, and odors from the building. The circulated air also dilutes airborne disease organisms. If the air is not continuously ventilated in an enclosed poultry house the components of the air changes. The concentration of carbon dioxide, ammonia and other harmful gases may then increase to unacceptable levels.

(2) Description of the Related Art, Including Information Disclosed Under 37 CFR 1.97 and 1.98

U.S. Pat. No. 9,302,606 5 Apr. 2016: Improvements in a self-tightening holding strap that grips onto a tube. The strap uses an elastomeric cushion with hook and loop fasteners to hold the strap onto a tubular pipe. The hook and loop fasteners allows the self-tightening holding strap to be easily installed, removed and repositioned where desired. The elastomeric cushion conforms around a textured or powder coated surface to increase the gripping forces. The elastomeric cushion can expand slightly as forces increase but retain the high grip. A tightening clasp allows an installer to pull from only one side of the self-tightening holding strap with one or both hands and using the elastomeric cushion to prevent the self-tightening holding strap from sliding on the pole. The self-tightening holding strap is to be sewn onto a cover, canopy or strap.

U.S. Pat. No. 7,441,732 28 Oct. 2008: Improvements in a self-tightening holding strap that grips onto a tube. The strap uses an elastomeric cushion with hook and loop fasteners to hold the strap onto a tubular pipe. The hook and loop fasteners allows the self-tightening holding strap to be easily installed, removed and repositioned where desired. The elastomeric cushion conforms around a textured or powder coated surface to increase the gripping forces. The elastomeric cushion can expand slightly as forces increase but retain the high grip. A tightening clasp allows an installer to pull from only one side of the self-tightening holding strap with one or both hands and using the elastomeric cushion to prevent the self-tightening holding strap from sliding on the pole. The self-tightening holding strap is to be sewn onto a cover, canopy or strap.

U.S. Pat. No. 8,549,711; 8 Oct. 2013: A hinge assembly for a door assembly includes a hinge having a first plate attached to a door and a second plate attached to a door jamb and pivotally connected to the first plate. The hinge assembly further includes a check strap having a first end portion configured to be attached to the first plate, a second end portion configured to be attached to the second plate, and a strip secured to the first end portion and to the second end portion. The strip has a length that is selected to limit opening movement of the door to a predetermined angle of opening. The hinge assembly further includes fasteners to secure the first end portion of the check strap and the first plate to the door and the second end portion of the check strap and the second plate to the door jamb.

BRIEF SUMMARY OF THE INVENTION

The current inventive concept is related to ventilation door systems commonly used in poultry and livestock houses. The vast majority of ventilation doors are operated by cable systems that need constant adjustments due to the stretching of the cables over time. If the ventilation doors are not tightly closed during adverse winter conditions, they will leak and cause cold air to enter the buildings which increases heating expenses and exposes the poultry to drafts.

Cables also become brittle over time and can break causing damage to doors and other equipment within the houses. For exemplary and illustrative purposes and not by reason of confinement to a particular industry application, the disclosed inventive concept, a "Pipe and Strap Operating Drive System" (referred to by the acronym, "PSODS" 1) will be demonstrated by its use in a poultry house.

The object of the PSODS 1 is to efficiently and accurately position a blocker, or door mechanism 20, over an opening that is of exact or similar profile as the door mechanism 20. In the preferred embodiment, PSODS 1 is used to vary the position of a poultry house ventilation blocker or door mechanism 20 in a tightly closed position against an opening, or when required, allow a certain range of door mechanism 20 open positions, as dictated by weather conditions or internal air quality. Essentially, the inventive concept featuring PSODS 1 utilizes a minimum of one strap, wherein a first end of each strap is wound about a length of tubular pipe, termed a "pipe drive" 2. The second end of the strap 17, 18 is attached proximate a "traveling edge" 21 of a "blocker," or door mechanism 20.

The pipe drive 2 may be rotated in one direction, about its longitudinal axis, to allow unwinding of the strap(s) 16, 17 so as to position the traveling edge 21 of the door mechanism 20 within a desired range of openness. Conversely, the pipe drive 2 may be rotated in the opposite direction, causing a tight winding of the strap(s) 17, 18 into a firm door-closing position. The term "door mechanism" 20 is utilized in this document so as to encompass barriers, gates, hatches, eaves, trapdoors, flaps, and other similar mechanisms. Therefore, the term "door mechanism" 20 is not intended to be limited to presentations, descriptions, and illustrations of poultry house doors in this disclosure.

BRIEF DESCRIPTION OF THE VIEWS OF DRAWINGS AS EXEMPLARY EMBODIMENTS OF THE INVENTIVE CONCEPT

FIG. 1 depicts a door mechanism 20 partially open, with left and right straps 17, 18 extended from pipe sleeves 10, 11, thus retaining door in the open position.

Figure 2:
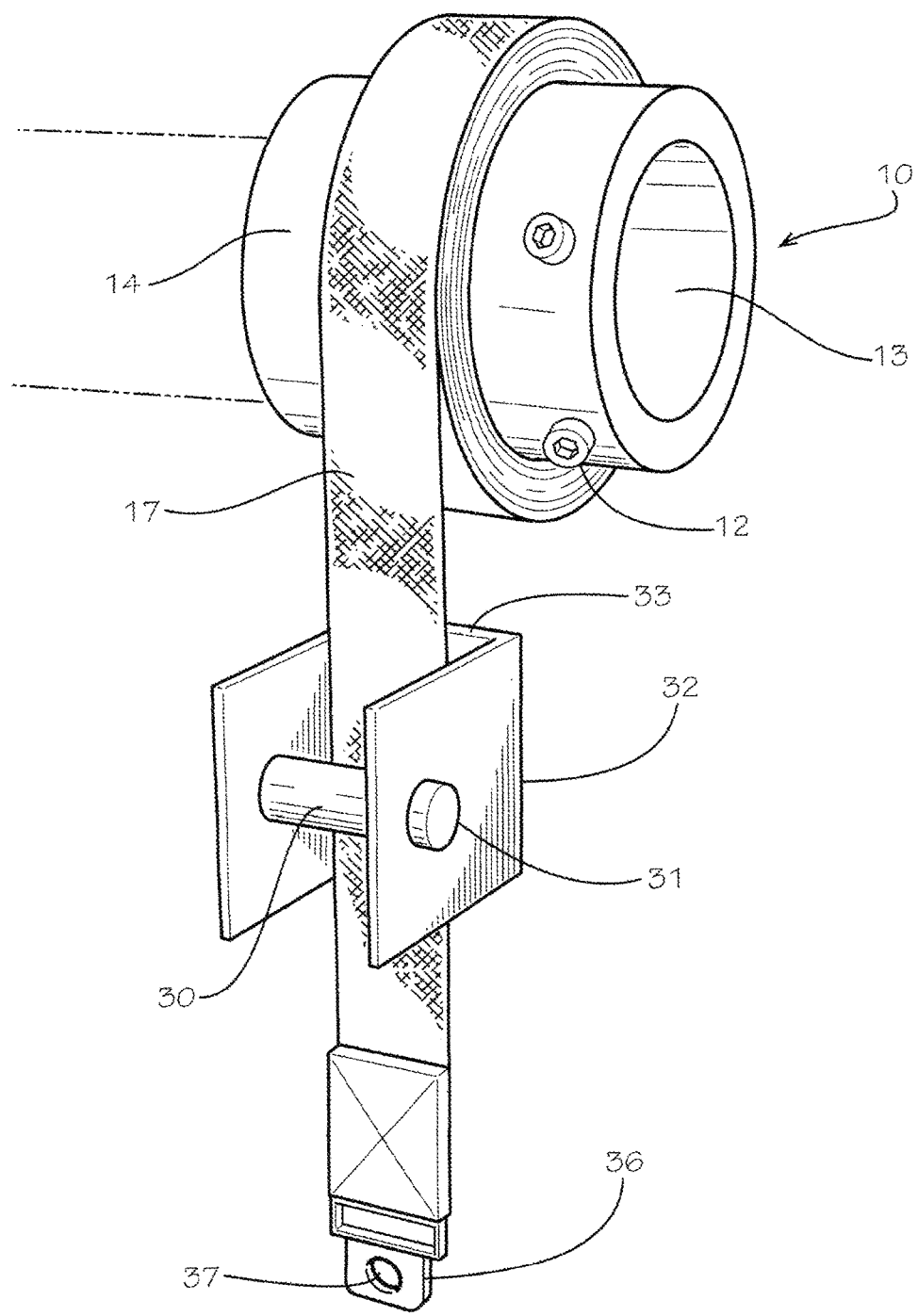

FIG. 2 presents an isolated view of the left pipe sleeve 10 having a strap 17 fully coiled about the exterior 14 of the pipe sleeve 10, the strap 17 having been placed within a guide bracket 32 and in close proximity to a roller pin 30.

Figure 3:
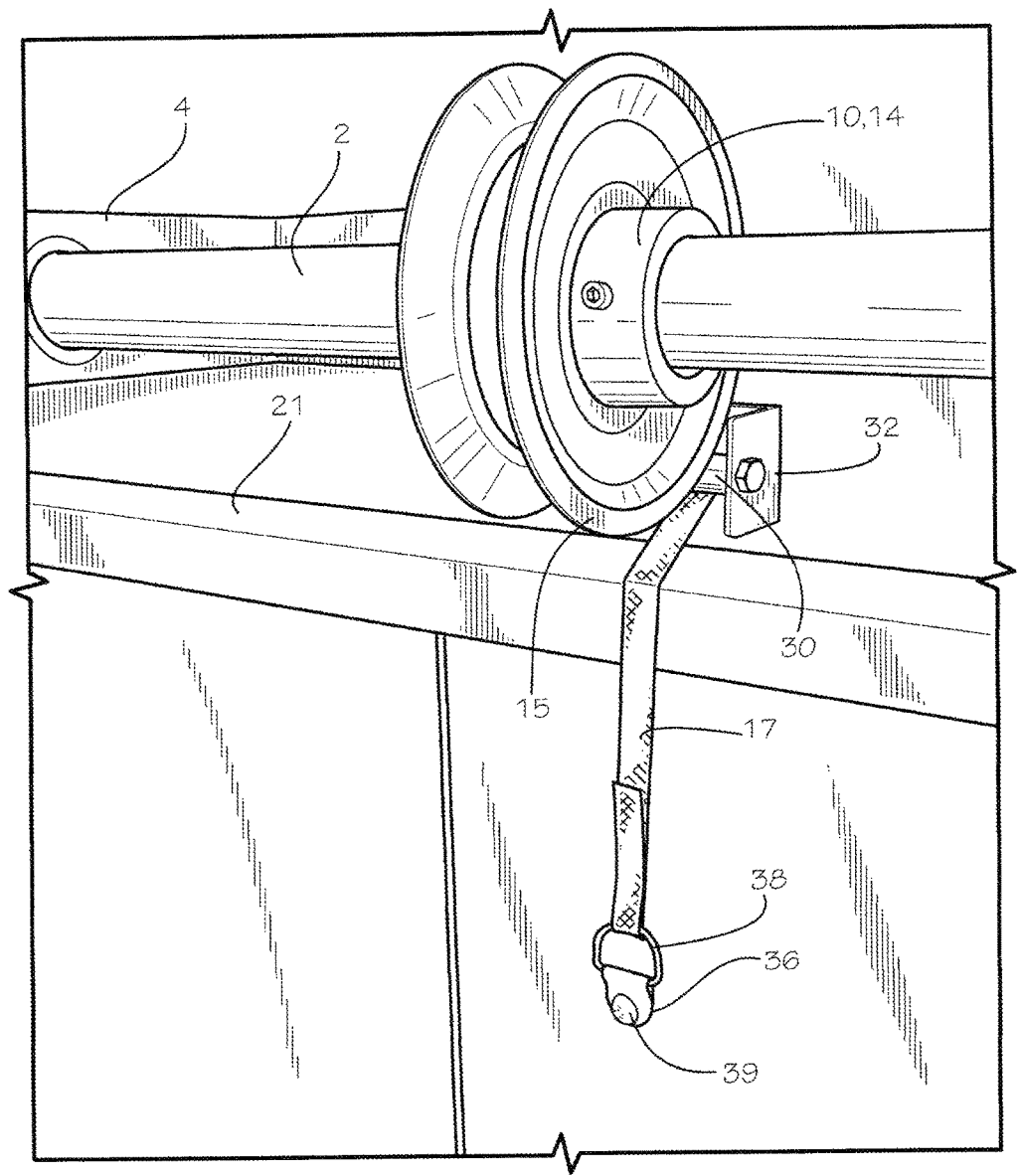

FIG. 3 illustrates a view proximate one end of the pipe drive 2, with a reel 15 attached to the exterior surface 14 of the corresponding pipe sleeve 10, further, the door mechanism 20 being secured in a closed position.

Figure 4:
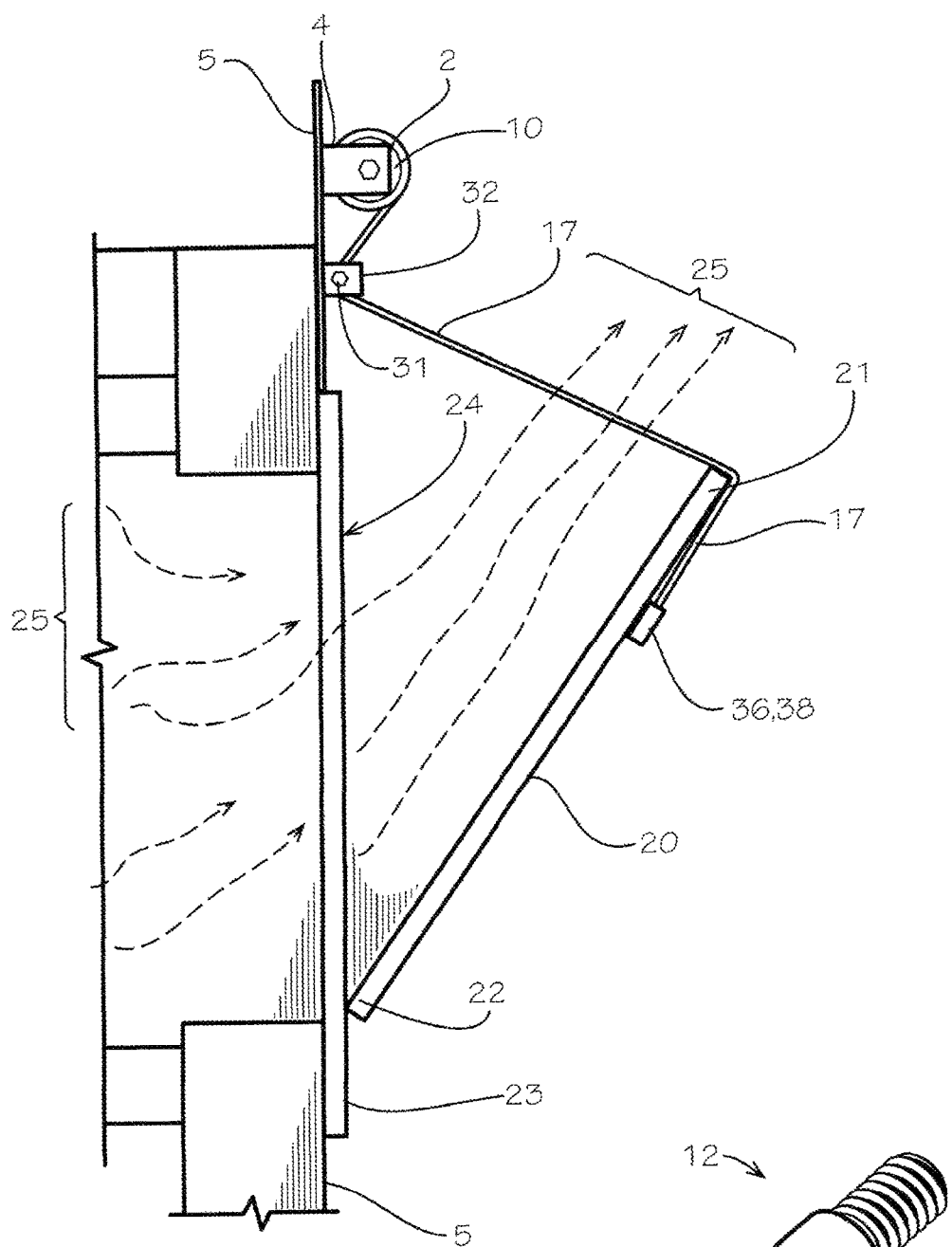

FIG. 4 presents a cutaway view of the arrangement of the PSODS 1 operating a door mechanism 20 attached vertically to a structure 5.

Figure 5:
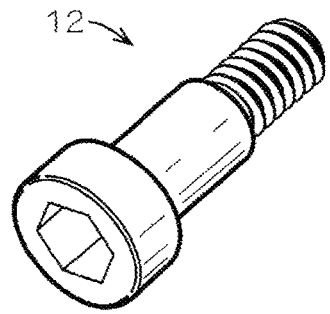

FIG. 5 is an enlarged view of a typical hexagonal head locking setscrew 12.

DETAILED DESCRIPTION OF THE INVENTION

The objects, features, and advantages of the inventive concept presented in this application are more readily understood when referring to the accompanying drawings. The drawings, totaling five figures, show the basic components and functions of embodiments and/or methods of use. In the several figures, like reference numbers are used in each figure to correspond to the same component as may be depicted in other figures.

The discussion of the present inventive concept will be initiated with FIG. 1, which illustrates the essential functional concept of the "Pipe and Strap Operating Drive System" ("PSODS" 1). The operation of PSODS 1 in FIG. 1 depicts a door mechanism 20 in a partially open position, relative to a vertically-oriented opening 24. The opening 24, for functional requirements, is built into a vertical surface of the depicted structure 5 and a perimetral frame 23 further surrounds the edges of the opening 24. The perimetral frame 23 coincides with the outer profile of the door mechanism 20.

The door mechanism 20 further comprises an upper "traveling" edge 21 and a bottom edge 22 (shown in FIG. 4) the bottom edge 22 being hingedly connected to the structure 5. By virtue of the operation of the PSODS 1, the traveling edge 21 moves in an arc pattern and when the door mechanism 20 is fully closed, the traveling edge 21 abuts the top portion of the perimetral frame 23.

As can be seen in FIG. 1, the door mechanism 20 is maintained in an open position by virtue of a left strap 17 and a right strap 18, each strap 17, 18 being symmetrically attached, at its first end by wound coils about a left pipe sleeve 10 and a right pipe sleeve 11, respectively. The left pipe sleeve 10 and the right pipe sleeve 11 are each rigidly affixed to the outer circumference of a horizontally-oriented pipe drive 2. The second end of each strap 17, 18 is connected to a bolt clip 36, which bolt clip 36 provides a means to fasten each strap 17, 18 to the door mechanism 20 by a wood or machine screw.

In FIG. 1 it is noted that two guide brackets 32 are affixed to the structure 5, each guide bracket 32 shown attached immediately below the respective placements of the left and right pipe sleeves 10, 11. The left strap 17 has been routed through the interior of a first guide bracket 32, and likewise, the right strap 18 is also routed through the interior of a second guide bracket 32. A more detailed rendering of the guide brackets 32 is depicted in FIG. 2.

It is to be pointed out that the PSODS 1 concept is not restricted to operating in conjunction with vertically-oriented planar structures, but may also be utilized on surfaces of structures built at an angle to the vertical, or horizontal ceiling-type structures. The door mechanism 20 may be either planar or manifest a curvilinear surface. The PSODS 1 is specifically designed and constructed to maintain a door mechanism 20 completely closed against the opening 24 or allow the door opening mechanism 20 to be positioned with a range of settings or positions spaced apart from the opening 24.

A key component of the PSODS 1 is the horizontally-oriented pipe drive 2, which, in the preferred embodiment, is a straight, pipe-like form. In FIG. 1, the depicted pipe drive 2 is shown supported on each end by an L-shaped brace 4, one leg of each brace 4 being securely attached to the surface of the structure 5. A collar 6 is shown to form an integral part of the outwardly protruding leg of the left brace 4. A collar, on both left and right braces 4, serves to form a circular housing within which each respective end of the pipe drive 2 may spin when the pipe drive 2 is rotated about its lengthwise axis 8. Each collar 6 may also provide access for the insertion of a manual or powered means of turning the pipe drive 2 about its axis 8.

FIG. 2 presents a close-up view of the left pipe sleeve 10 enveloped by a certain length of the left strap 17 coiled about the exterior 14 of the pipe sleeve 10. A segment of the left strap 17 is contained within the guide bracket 32, between the bracket's spine 33 and a roller pin 30. The first end of the left strap 17 terminates with an integral bolt clip 36, which bolt clip 36 contains a hole 37 through which a screw or other fastener may be used to fix the first end of the left strap 17 to the aforementioned door mechanism 20.

Each roller pin 30 also ensures a smooth and bind-free operation of the left and right straps 17, 18 when operating the door mechanism 20. Also, importantly, the roller pin 30 in each of the two guide brackets 32 provides a fulcrum effect by which each of the straps 17, 18 may assert mechanical advantage to efficiently maneuver the weight of the door mechanism 20 about its range of motion.

Each guide bracket 32 is attached to the surface of a structure 5 with standard wood screws just below the respective pipe sleeve 10, 11 and ensures the correct positioning of each strap 10, 11 relative to both the pipe sleeve and the door mechanism 20. The guide bracket 32 and its roller pin 30 also create the correct angle of each strap 17, 18 in relation to opening and closing of the door mechanism. The exact same functional connections and components are likewise applicable to the right pipe sleeve 11 and right strap 18.

The above-described arrangement of each strap 17, 18 allows the straps 17, 18 to move the door mechanism 20 by causing the traveling edge 21 to rotate in an arc, relative to the hingedly-fixed bottom edge 22. Thus, the traveling edge 21 is pulled toward a closed position or released toward a partially or fully open position relative to the door frame 23. Both straps 17, 18 perform their work by virtue of rotation of the pipe drive 2. This in turn, causes the left and right pipe sleeves 10, 11 to either progressively collect or release a sufficient length of the respective straps 17, 18, thereby moving the door mechanism 20 toward a closed or open position.

As an example of assembling the PSODS 1, typically the interior surfaces 13 of the pipe sleeves 10, 11 are is slipped over the pipe drive 2. The strap 17, prior to assembly, has been attached to the outer surface 14 of each pipe sleeve 10, 11. Each pipe sleeve 10, 11 is then placed into the correct position symmetrically along the length of the pipe drive 2. Next, a number of hex-head locking setscrews 12 are each placed into threaded apertures 3 of the pipe sleeve 10. The setscrews 12 are then turned clockwise with an appropriate tool, which compresses the setscrews 12 against the outer surface of the pipe drive 2 and locks the pipe sleeve 10 into position.

The same steps are repeated with as many pipe sleeves 10, 11 as may be necessary. As shown by FIG. 1 of this exemplary disclosure, a minimum of two pipe sleeves 10, 11 are placed around the circumference of a straight pipe drive 2, symmetrically located along the length of the pipe drive 2. The securing of, for instance, the two pipe sleeves 10, 11 shown, onto the pipe drive 2 then compels each pipe sleeve 10, 11 to rotate in a conforming direction whenever the pipe drive 2 is turned axially.

Thus, the attached straps 17, 18 serve to maneuver the door mechanism 20 into a closed position flush with the opening 20, or a range of angular positions spaced apart from the opening 24. An angular, open position of the door mechanism 20 is illustrated in FIG. 1. The pipe drive 2 may be turned manually with a hand crank, or by powered means, utilizing an industry standard gear/motor machine connected to the interior of the collar 6. As the pipe sleeves 10, 11 rotate with the turning of the pipe drive 2, the straps 17, 18 will wind in or out (shortening or lengthening the amount of exposed strap 17, 18) depending on the direction of rotation of the pipe drive 2.

FIG. 3 presents an alternate embodiment of the PSODS 1, in which a reel 15 is permanently attached to the exterior surface 14 of the left pipe sleeve 10. The reel 15 serves to retain the windings of the strap 17 within a compacted and orderly retaining area during operation of the PSODS 1. A similar reel 15 may also be attached to the right pipe sleeve 11 for better strap 18 retention. The traveling edge 21 of the door mechanism 20 is shown abutting the surface of a structure 5. Also shown in FIG. 3 is a C-ring 38 and a bolt clip 36, which bolt clip 36 is fastened to the door mechanism 20 shown by a wood or machine screw 39.

FIG. 4 depicts a cutaway view of a vertical surface of a structure 5 having an opening 24 and a frame 23. The previously-described door mechanism 20 is shown in an open position, the bottom edge 22 of the door mechanism 20 having rotated about a hinged connection on the lower part of the frame 23. Ventilated air 25 is shown escaping the interior of the structure 5 and flowing outward through the opening 24. One brace 4 is depicted supporting a pipe drive 2, the pipe drive 2 having a pipe sleeve 10 attached thereto.

FIG. 5 displays a common hex-head setscrew 12 which is used in this inventive concept.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A pipe and strap operating drive apparatus for positioning a door mechanism of a certain size, the door mechanism having a traveling edge and a hinged edge, which door mechanism (a) is hingedly attached to a structure, and (b) is proximate a correspondingly-sized opening in the structure, wherein the apparatus positions the door mechanism fully closed flush over the opening, or within a range of positions spaced apart from the opening, the apparatus further comprising:

a length of pipe, two braces affixed to the structure, such that each brace rotatingly supports one end of the pipe, at least one pipe sleeve affixed to the pipe, at least one strap coiled about the outer circumference of the at least one pipe sleeve, at least one guide bracket having a roller pin, and a plurality of hexagonal-head locking setscrews, wherein the at least one strap has its first end attached to the pipe sleeve, and its second end attached so as to overlap the traveling edge of the door mechanism.

2. The pipe and strap operating drive device as in claim 1, further comprising a circular-shaped reel co-axially affixed onto the exterior surface of the at least one pipe sleeve.

3. The pipe and strap operating drive device as in claim 1, further comprising a bolt clip for retention of one end of the at, least one strap to the external surface of the door mechanism, overlapping the traveling edge of the door mechanism.

4. The pipe and strap operating drive device as in claim 1, further comprising a first pipe sleeve co-axially affixed proximate one end of the pipe and a second pipe sleeve co-axially affixed proximate the opposite end of the pipe; a first guide bracket and a second guide bracket, each having a roller pin, said guide brackets being attached to the surface at locations in alignment with the first pipe sleeve and second pipe sleeve, respectively, and parallel to the length of pipe; a left strap having one end attached to the first pipe sleeve and routed so as to travel about the roller pin of the first guide bracket, with the opposite strap end attached over the traveling edge of the door mechanism; and a right strap having one end attached to the second pipe sleeve and routed so as to travel about the roller pin of the second guide bracket, with the opposite strap end attached over the traveling edge of the door mechanism.

5. The pipe and strap operating drive device as in claim 1, wherein each brace is constructed with a circular collar for accommodation of the exterior circumference of each end of the length of pipe.

6. The pipe and strap operating drive device as in claim 1, further having a manual means or a motorized means of axially rotating the length of pipe.

7. A pipe and strap operating drive apparatus for positioning a door mechanism of a certain size, the door mechanism having a traveling edge and a hinged edge, which door mechanism (a) is hingedly attached to a structure, and (b) is proximate a correspondingly-sized opening in the structure, wherein the apparatus positions the door mechanism at any desired hinged position between fully closed flush over the opening, or spaced apart from the opening, the apparatus comprising a length of pipe, two braces, two each of pipe sleeves, straps, guide brackets, roller pins, fasteners, bolt clips, and further comprising a plurality of hexagonal head locking setscrews for fastening the pipe sleeves onto the pipe; wherein the pipe is supported, at each end, within the respective braces, each brace further having a circular collar, the interior of the collar corresponding to the outer diameter of the pipe, thereby enabling axial rotation of the pipe within the collars, each brace further being fastened to the structure so as to provide co-axial alignment of the circular collars;

two pipe sleeves symmetrically spaced lengthwise, and affixed to, the outer surface of the pipe;

each guide bracket affixed to the structure, at respective locations directly opposite the midpoint of the width of each pipe sleeve, each guide bracket containing a freely-rotating roller pin;

each strap attached at its first end to the exterior of each respective pipe sleeve, routed through the respective guide bracket to thereby contact the contained roller pin, and attached at its second end to a bolt clip, said bolt clip being affixed to the exterior surface of the door mechanism; whereby axial rotation of the pipe in one direction causes the pipe sleeves to simultaneously rotate, thereby coiling each strap about its respective pipe sleeve, moving toward the fully-closed position of the door mechanism, and conversely, upon rotation of the pipe in the opposite direction, causes each strap to uncoil from the pipe sleeve, moving toward the open position of the door mechanism.

8. The pipe and strap operating drive system as in claim 7, further comprising two circular-shaped reels, one each of said reels co-axially affixed onto the exterior circumference of each of the two pipe sleeves, with the respective first end of each strap being, affixed to the reel core.

9. The pipe and strap operating drive system as in claim 7, further having a motorized means of axially rotating the length of pipe within the collars of the braces.

10. A pipe and strap operating drive apparatus for positioning a ventilation door of a poultry house, the ventilation door being of planar and having a traveling edge and a hinged edge, by means of which the ventilation door (a) is hingedly attached to a vertical wall of the poultry house, and (b) is proximate a correspondingly-sized opening in the vertical wall, wherein the apparatus positions the ventilation door at any desired hinged position between fully closed flush over the opening, or spaced apart from the opening, the apparatus comprising:

a length of pipe, two braces, two each of pipe sleeves, straps, guide brackets, roller pins, fasteners, bolt clips, and further comprising a plurality of hexagonal head locking setscrews for fastening the pipe sleeves onto the pipe; wherein the pipe is supported, at each end, within the respective braces, each brace further having a circular collar, the interior of the collar corresponding to the outer diameter of the pipe, thereby enabling axial rotation of the pipe within the collars, each brace further being fastened to the vertical wall so as to provide co-axial alignment of the circular collars;

two pipe sleeves symmetrically spaced lengthwise, and affixed to, the outer surface of the pipe;

each guide bracket affixed to the vertical wall, at respective locations directly opposite a midpoint of the width of each pipe sleeve, each guide bracket containing a freely-rotating roller pin;

each strap attached at a first end to the exterior of each pipe sleeve, routed through the respective guide bracket to thereby contact the contained roller pin, and attached at a second end to a bolt clip, said bolt clip being affixed to an exterior surface of the ventilation door; whereby axial rotation of the pipe in one direction causes the pipe sleeves to simultaneously rotate, thereby coiling each strap about respective pipe sleeve, moving the ventilation door toward the fully-closed position, and conversely, upon rotation of the pipe in the opposite direction, causes each strap to uncoil from the pipe sleeve, moving the ventilation door toward the open position.

11. The pipe and strap operating drive system as in claim 10, further comprising two circular-shaped reels, one each of said reels co-axially affixed onto an exterior circumference of each of the two pipe sleeves, with the first end of each strap being affixed to the reel core.

12. The pipe and strap operating drive system as in claim 10, further having a motorized means of axially rotating the length of pipe within the collars of the braces.

* * * * *